(12) United States Patent
Meldahl (10) Patent No.: US 7,720,609 B2
(45) Date of Patent: May 18, 2010

(54) METHOD OF SEISMIC SIGNAL PROCESSING

(75) Inventor: Paul Meldahl, Forus (NO)

(73) Assignee: Statoil ASA, Stavanger (NO)

( * ) Notice: Subject to any disclaimer, the term of this patent is extended or adjusted under 35 U.S.C. 154(b) by 210 days.

(21) Appl. No.: 11/795,105

(22) PCT Filed: Jan. 10, 2006

(86) PCT No.: PCT/GB2006/000075

§ 371 (c)(1),
(2), (4) Date: Oct. 16, 2007

(87) PCT Pub. No.: WO2006/075143

PCT Pub. Date: Jul. 20, 2006

(65) Prior Publication Data

US 2008/0147327 A1    Jun. 19, 2008

(30) Foreign Application Priority Data

Jan. 11, 2005    (GB)    ................... 0500484.1

(51) Int. Cl.
*G01V 1/28*    (2006.01)
*G01V 1/00*    (2006.01)

(52) U.S. Cl. ......................................... 702/17; 367/38

(58) Field of Classification Search ............ 702/17, 702/1, 2, 11, 14, 16, 58, 81, 182, 183, 185, 702/189; 367/37, 38, 73; 706/15, 928, 929; 703/5, 10

See application file for complete search history.

(56) References Cited

U.S. PATENT DOCUMENTS

| 5,892,732 A | 4/1999 | Gersztenkorn et al. |
| 6,725,163 B1 | 4/2004 | Trappe et al. |
| 6,735,526 B1 * | 5/2004 | Meldahl et al. ............... 702/14 |

FOREIGN PATENT DOCUMENTS

| FR | 2 765 344 | 12/1998 |
| WO | WO 00/16125 | 3/2000 |
| WO | WO 01/90782 | 11/2001 |
| WO | WO 02/27355 | 4/2002 |
| WO | WO 2004/044617 | 5/2004 |

OTHER PUBLICATIONS

Wood et al., Decreased Stability of Methane Hydrates in Marine Sediments Owing to Phase-Boundary Roughness, Dec. 12, 2002, Nature, vol. 420, pp. 656-660.*
Meldahl et al., Identifying Faults and Gas Chimneys Using Multiattributes and Neural Networks, May 2001, The Leading Edge, pp. 474-482.*

* cited by examiner

*Primary Examiner*—Michael P. Nghiem
*Assistant Examiner*—Toan M Le
(74) *Attorney, Agent, or Firm*—Patterson Thuente Christensen Pedersen, P.A.

(57) ABSTRACT

A method of assessing acquisition errors in seismic images in a seismic data volume. The method includes selecting a seismic attribute in a seismic data volume and then stacking seismic quality image measurements taken along the selected attribute. The stacked measurements are then related on the basis of any vertical correlation and any vertically correlated feature is identified as a cobweb. Any identified cobwebs are removed from the seismic data volume.

9 Claims, 8 Drawing Sheets

METHOD OF SEISMIC SIGNAL PROCESSING

RELATED APPLICATIONS

This application claims priority to PCT Application No. PCT/GB2006/000075 filed Jan. 10, 2006, and Great Britain Application No. 0500484.1 filed Jan. 11, 2005, the disclosures of which are hereby incorporated by reference in their entirety.

FIELD OF THE INVENTION

The present invention is concerned with a method of monitoring and assessing distortion and degradation in seismic images. The invention is applicable both to on shore and off shore exploration.

BACKGROUND OF THE INVENTION

In conventional 3-D seismic surveying, seismic data is acquired along closely spaced lines which provide detailed subsurface information. With such high-density coverage, large volumes of digital data must be recorded, stored and processed prior to interpretation. The processing requires extensive computer resources. When the seismic data has been processed it is interpreted in the form a 3-D cube (or seismic data volume) which effectively represents a display of subsurface features. The information within the cube can be displayed in various forms, such as horizontal time slice maps, vertical slices or sections in any direction.

In traditional seismic interpretation, one or more seismic events is identified and tracked to yield a set of seismic horizons. Together these horizons are used to form the structural framework of the subsurface in two-way time or depth as the case may be. All subsequent geological modelling and most of today's seismic inversion schemes rely heavily on this framework. For example, seismic attributes can be extracted around an interpreted horizon and used to characterise a reservoir unit.

The task of seismic imaging areas of the earth's crust requires a series of complex physical and simulated processes. For several reasons, these processes deviate from ideal imaging conditions and therefore the seismic images tend to be degraded or distorted.

A challenge in the seismic imaging field is therefore to monitor the quality and conditions at all stages of the imaging process and finally to evaluate the quality of the seismic images to be used in building geological models of the subsurface.

Distortions of imaging conditions such as instabilities, inaccuracies or technological limitations may have quite complicated degradation effects on seismic images. Each step of the imaging process will both transform previous degradations in the seismic images and create new ones.

The seismic image quality is generally defined in terms of temporal and spatial resolution, amplitude fidelity and signal to noise ratio. The image qualities can easily be measured on synthetic seismic images, which contain only one simple seismic event. In this case, the qualities can be measured directly. However, in real seismic events, the shape and complexity of the subsurface layers may distort measurements of quality. In addition, numerous different seismic events and noise may interfere and distort the direct quantification of the quality of the seismic data obtained. Human error, inaccuracies and technological limitations will further distort the seismic data and hence the seismic image produced.

The present invention addresses the need to reduce the distortion of the quality measurements.

In some of these techniques measurements following a seismic event are taken within several windows and stacked together vertically. The techniques are therefore less sensitive to lateral variations in the geology and represent an improvement over prior conventional techniques.

It is therefore an object of the present invention to provide a method of seismic data which is particularly sensitive to acquisition errors and external influences, such as human error, inaccuracies and technological limitations. It is a further object of the present invention to provide a method of assessing and reducing distortion and degradation in seismic images caused by these errors.

It is difficult to predict the presence of such influences, which may occur individually or in groups at any one time. These influences occur at the position within the area to be surveyed where the survey equipment, such as the source and receivers, is located at that time. These influences affect all seismic traces locally and lead to errors in the seismic data obtained. The local volume which is established is called a "cobweb."

After processing the acquired seismic data in a conventional manner, the errors are to some degree migrated outside to nearby traces in the seismic data volume. The size and nature of these "cobwebs" is dependent on such factors as the seismic data acquisition geometry, the geometry of the subsurface and the sound velocities of the subsurface. The size of the cobwebs or cobweb data volumes is in the order of the maximum source receiver offset and the vertical extension is equal to the seismic trace length. The cobwebs may be difficult to identify by eye and even more difficult to detect by standard quality measurements, since the geological footprint may dominate.

According to the present invention, there is provided a method of assessing acquisition errors in a seismic data volume, comprising the steps of: selecting seismic objects as reflectors in a seismic data volume; measuring one or more qualities of the objects; vertically stacking the measured quality; relating the stacked measurements on the basis of any vertical correlation; and identifying any vertically correlated feature as a cobweb.

Effectively, therefore, the method of the present invention includes the steps of using a series of quality measurements made on a series of seismic attributes within a moving seismic volume, preferably normalising the quality measurements in time or depth intervals, and stacking them vertically to reduce the lateral geological footprint of the quality map. The qualities may be, for example, energy, coherency, dominant frequency or any other seismic attribute.

Preferably, the quality seismic image measurements are first normalised before the stacking step. Preferably, the measurements which are stacked are taken from different locations in the seismic cube. The locations may be inside reflectors, faults or other objects.

The selecting, stacking and relating steps may be performed at the same time as the data is acquired. Alternatively, some of these steps may be carried out on previously acquired data.

The method of the present invention is specialised or focused to detect these cobwebs and may use seismic object detection systems as described in WO00/16125 to point at objects where a quality can be measured. The method may use an unlimited number of seismic attributes to be able to point at these objects. Neural networks can perform the classification of the enhanced attributes, either supervised or unsupervised.

Within a seismic data volume, several classes of seismic objects are present, for example, seismic chimneys, faults and reflectors. Preferably, seismic reflectors are used to detect or sample possible cobwebs as they are the easiest attribute to detect and enhance by automated methods and may be the most sensitive to lateral quality variations. Any given seismic data volume will also contain numerous seismic reflectors, and cobwebs are easier to separate from reflectors than any other seismic object. Furthermore, reflectors do not need to migrate to be detectable and can therefore be monitored during acquisition of the seismic data. In this way, data samples which are not recognised as reflectors can be left out of the quality classification process. This greatly simplifies the method of the present invention, and geological footprint is reduced in the quality map.

To make the detection sensitive enough to be able to separate cobwebs from the reflectors and other types of noise, vertical stacking of quality measurements is needed.

Due to the systematic reduction in data qualities along the vertical axis, both due to the absorption of sound in the earth's crust, and limitations in the imaging concept, vertical normalisation of the quality values may be conducted before they are stacked.

BRIEF DESCRIPTION OF THE DRAWINGS

An embodiment of the present invention will now be described by way of example only and with reference to the accompanying drawings, in which.

While the present invention is amendable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION

The errors and limitations in obtaining the raw data may include, for example, human error, inaccuracy and technological limitations. The size of the "cobwebs" is dependent on such factors as the geometry of the acquired data (e.g. where the data is acquired in the vertical or horizontal directions) and the sound velocity in the subsurface. The size of the cobwebs is in the order of the maximum source receiver offset and the vertical extension equal to the size of the trace length. The cobwebs may be difficult to identify by eye and even more difficult to detect by standard quality measurements, due to lateral variations in geology.

Quality measurements are performed along the detected reflectors within the particular data volume and the measured quality is normalised in time or depth intervals within the data volume. The normalised quality measurements are in turn stacked and the stacked measurements are then related to a surface point above the centre of the cobweb data volume.

Calculation of attribute qualities are conducted on well-defined reflectors in each sample of the seismic cube. Attribute qualities include such things as energy or absolute amplitude, dominant frequency, center frequency, and steered median difference or noise.

Reflectors are generally detected using attributes such as amplitude, spatial similarity or coherency, and local dip and azimuth which is approximately horizontal.

The analysis of the seismic cube is divided into sections or sub-cubes and the mean quality attribute value is calculated in the vertical direction for each sub-cube. The mean quality attribute values are then normalised within each sub-cube. This helps account for changes which occur in the cube in one vertical direction, for example, loss of high frequencies and increase in noise. Finally, the mean value of the normalised quality attributes taken from all the sub-cubes are calculated in the vertical direction.

Figure 1:
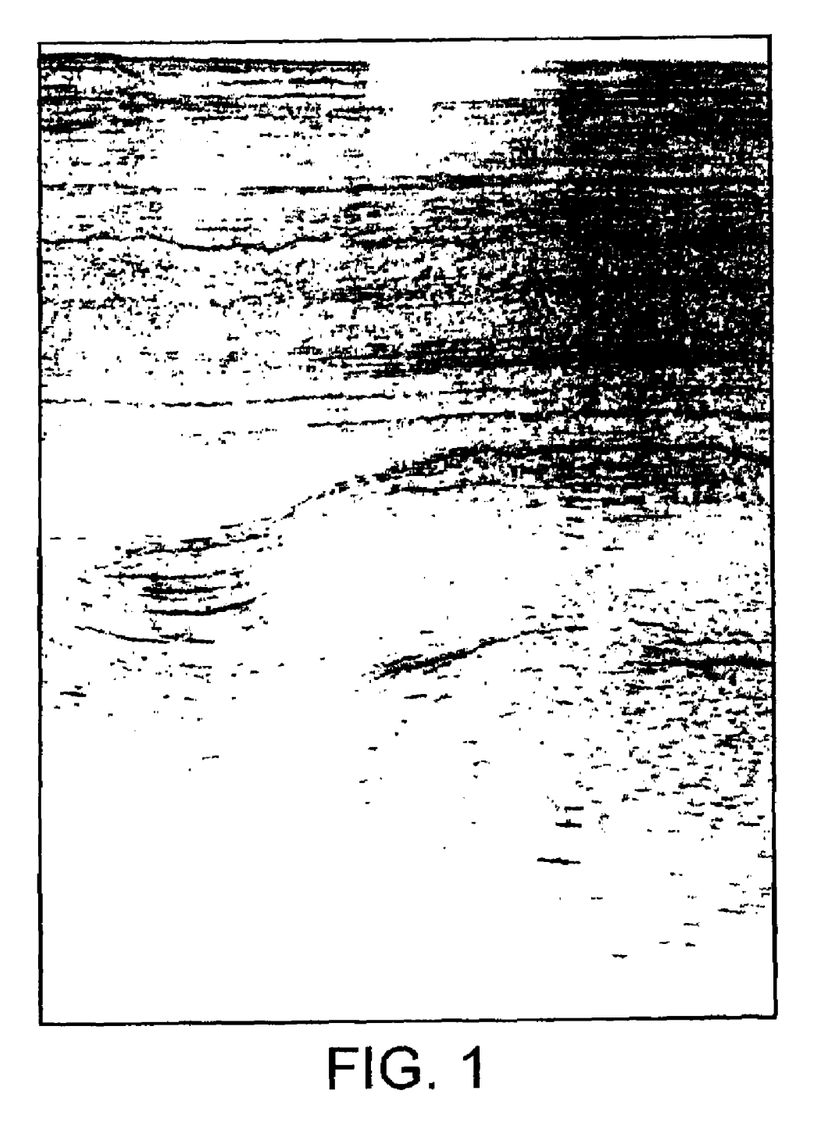
FIG. 1 is a standard vertical section through a seismic cube.
Figure 1A:
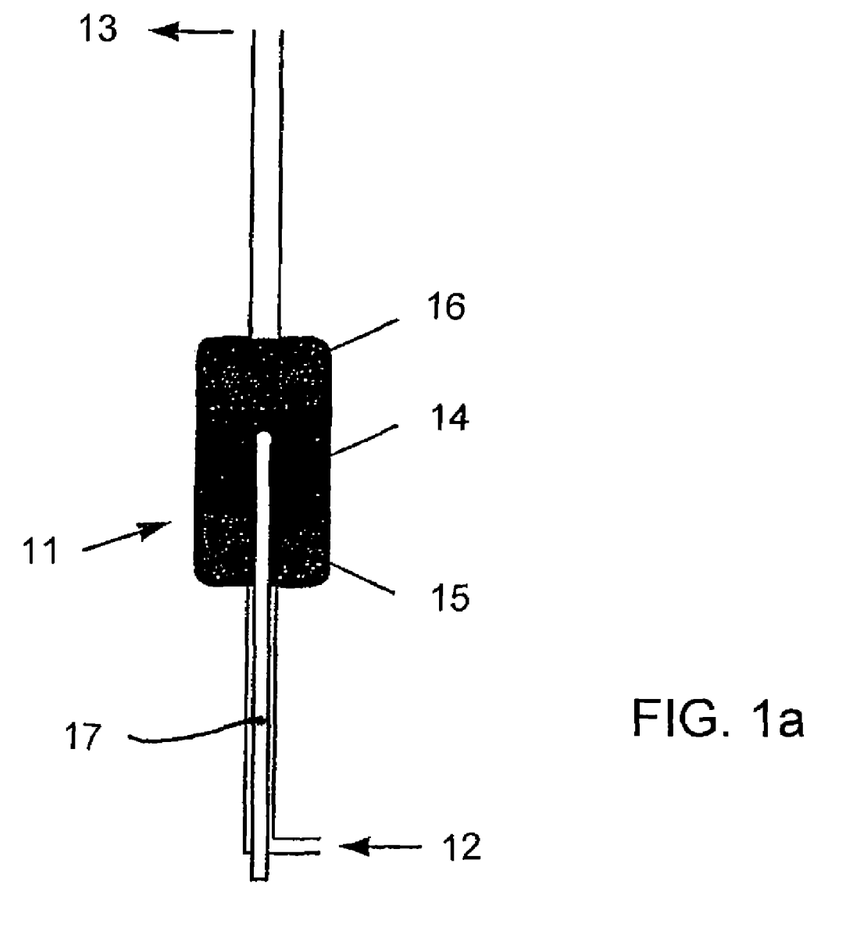
FIG. 1a is a vertical section through a quality control steering cube.
Figure 2:
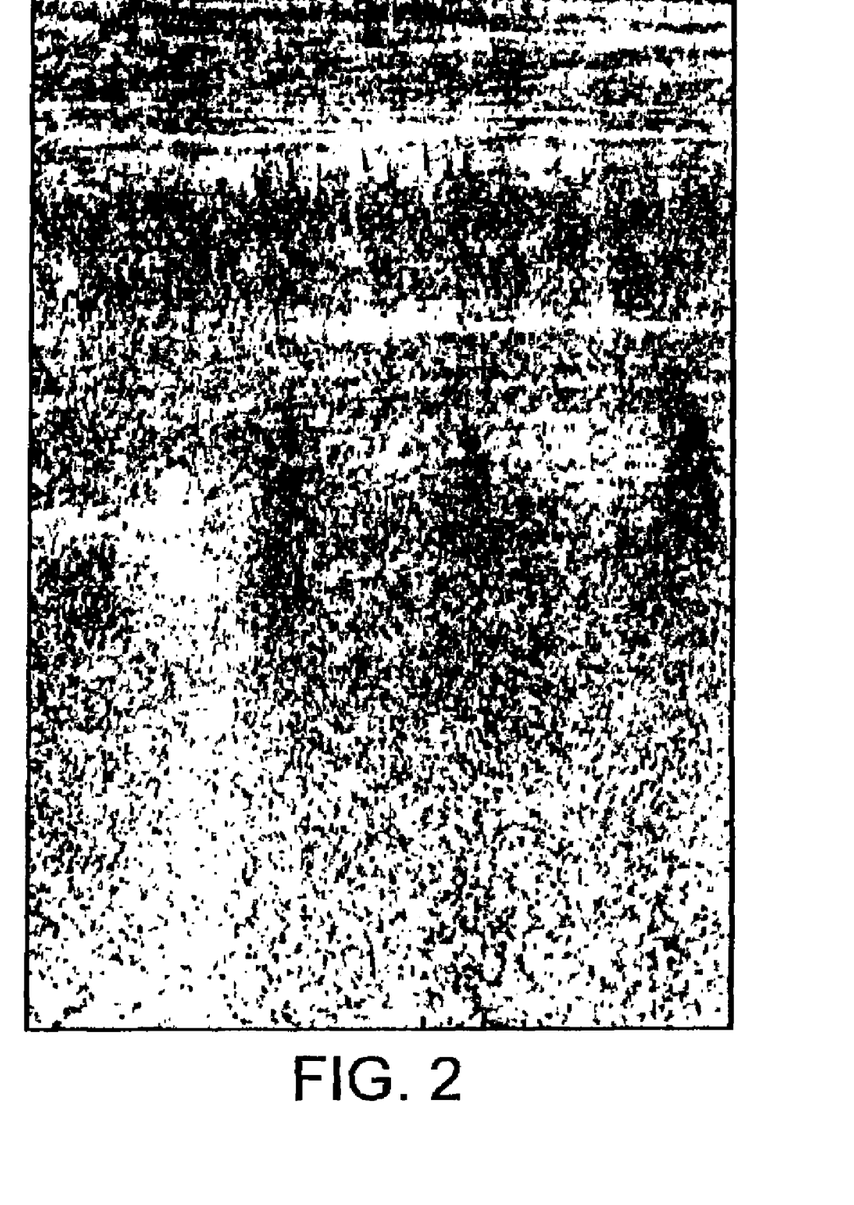
FIG. 2 is a section through a reflector cube in which samples not being part of a reflector are given the value "0;"
Figure 3:
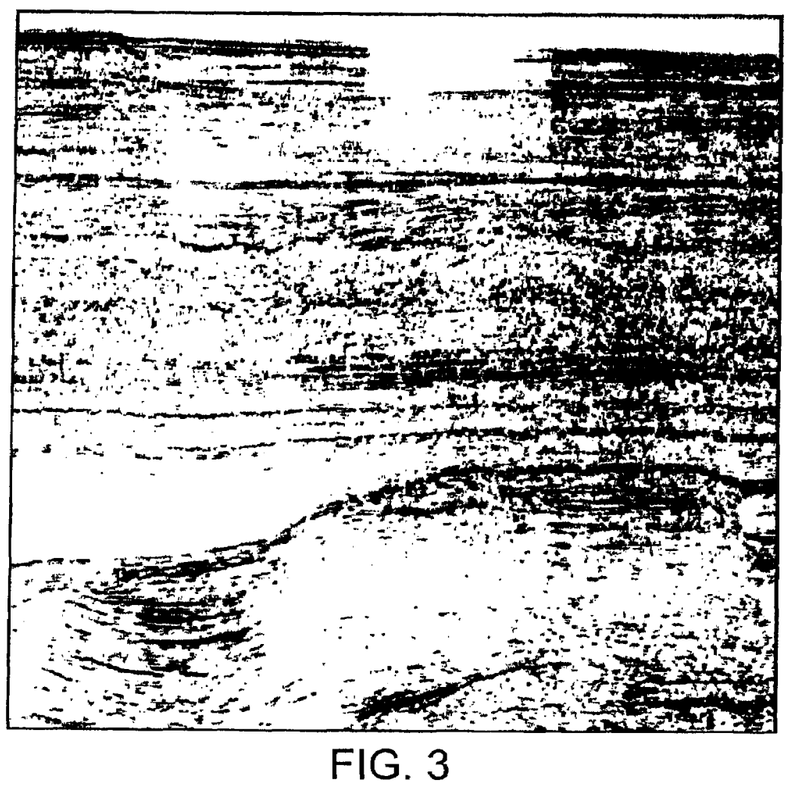
FIG. 3 is a section showing a selection of detected reflectors having a certain amount of lateral similarity.
Figure 4:
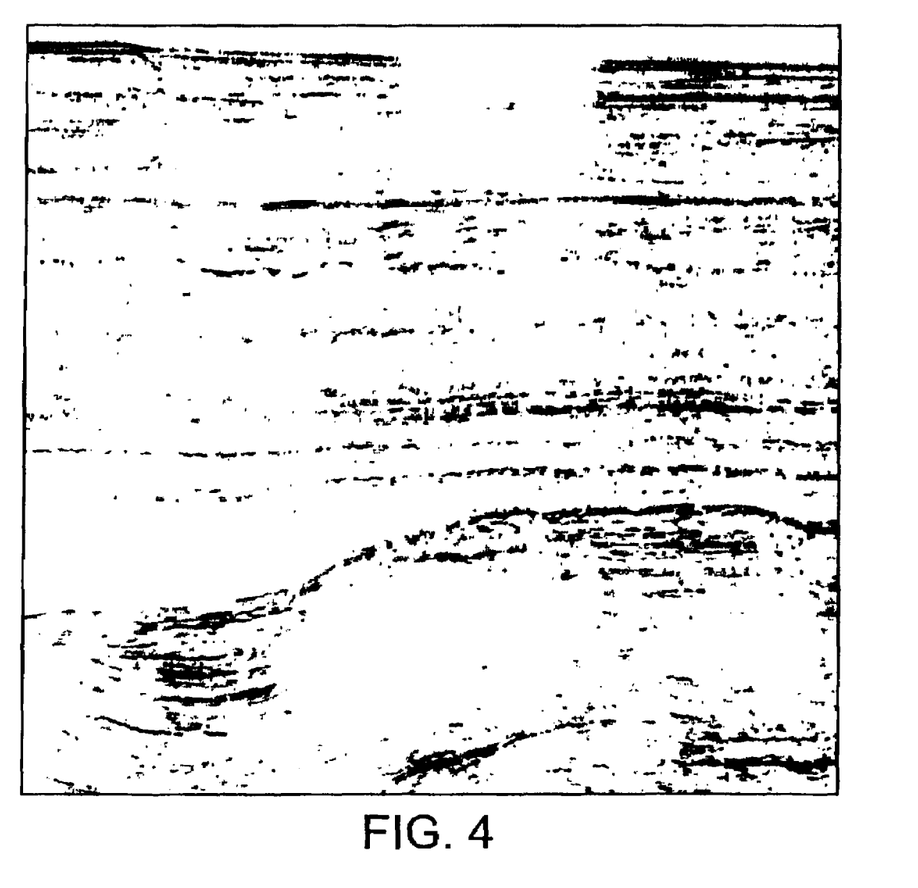
FIG. 4 shows energy calculated along the detected reflectors of FIG. 3.
Figure 5:
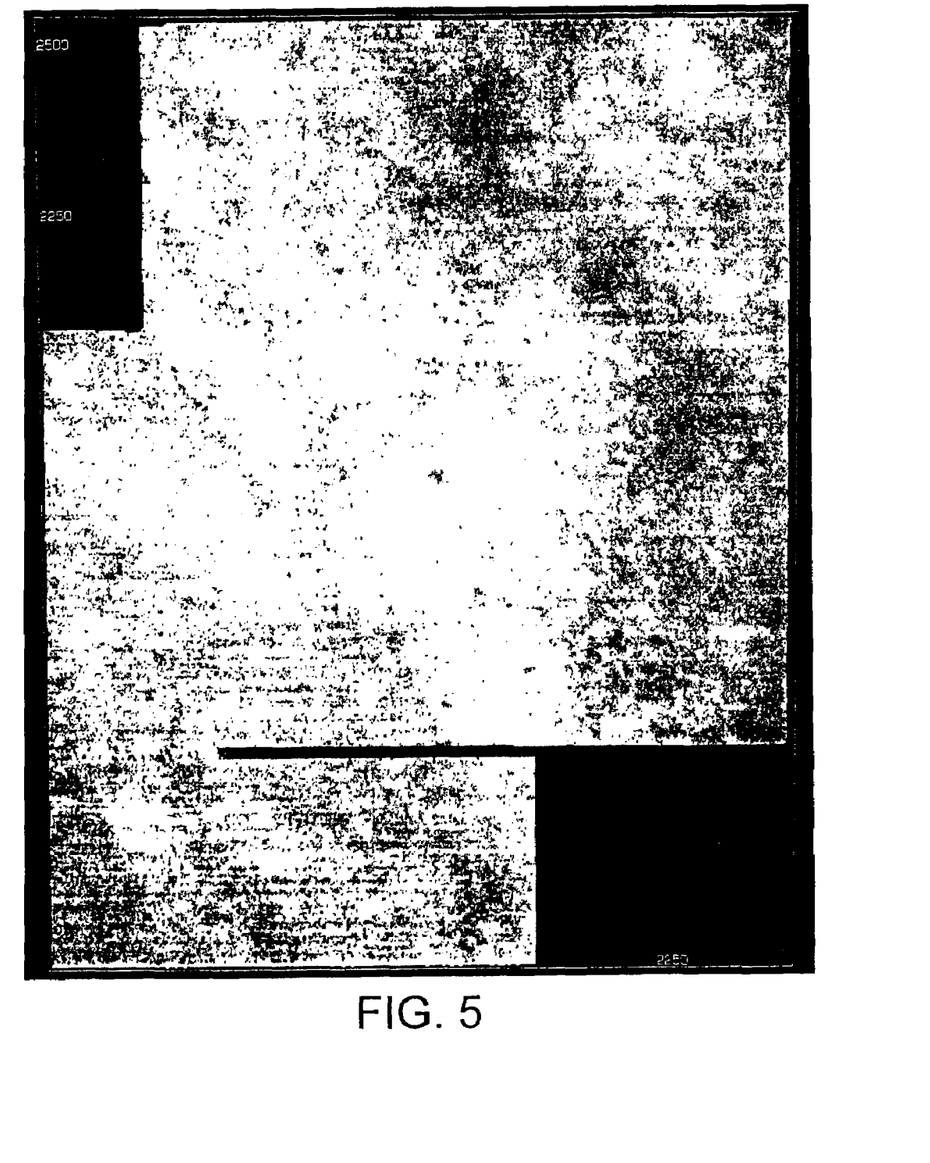
FIG. 5 is a display of a quality map where normalised quality maps from several time windows in the cube are stacked together.

Thus, referring to FIGS. 3 and 4, firstly, a small moving calculation window which is oriented along the dip azimuth in the data (steering cube) is employed to look for similarities. If similarity is above a selected level, samples within the window are defined as a reflector (or other object). This produces a seismic reflector cube where samples are put to zero if they are not part of a seismic reflector.

Then a long calculation window is employed to remove shorter reflector fragments. This gives an improved seismic reflector cube with samples which are part of short reflector fragments being Put to zero. So, these two steps effectively determine which samples are part of a reflector and which are not. Next, a non-zero interval is employed where samples which have any zero are disregarded. Thus, in this step, effectively, "small" indications of a reflector are removed, so producing an improved seismic reflector cube.

Calculations are carried out on the samples in the improved seismic reflector cube which are determined to be part of a reflector to produce quality control (QC) sub-cubes. The QC sub-cubes are then subjected to averaging and normalisation programs in order to provide mean values of normalised quality attributes in the vertical direction within each sub-cube, to give QC surfaces. The surfaces are then stacked.

Figure 6:
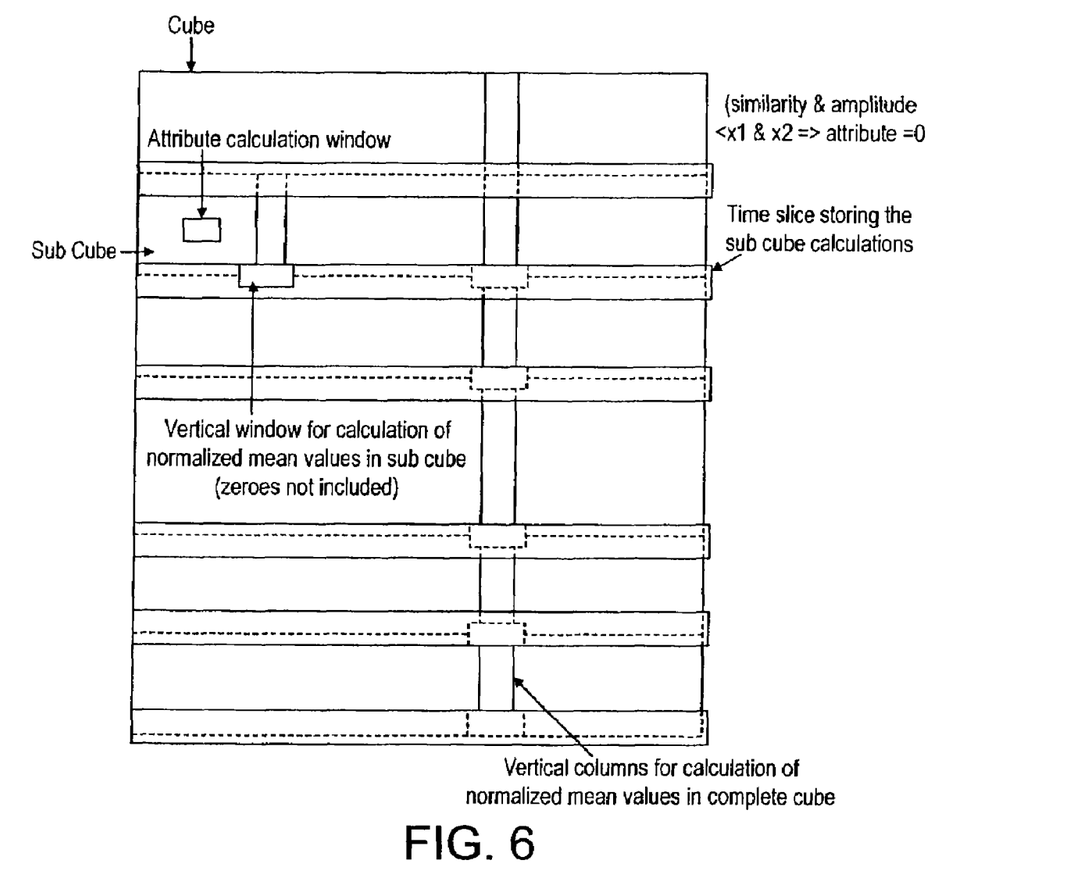
FIG. 6 is a figurative view of a seismic cube or seismic data volume clearly indicating the vertical stacking of the normalised quality measurements in accordance with the method of the present invention.
Figure 7:
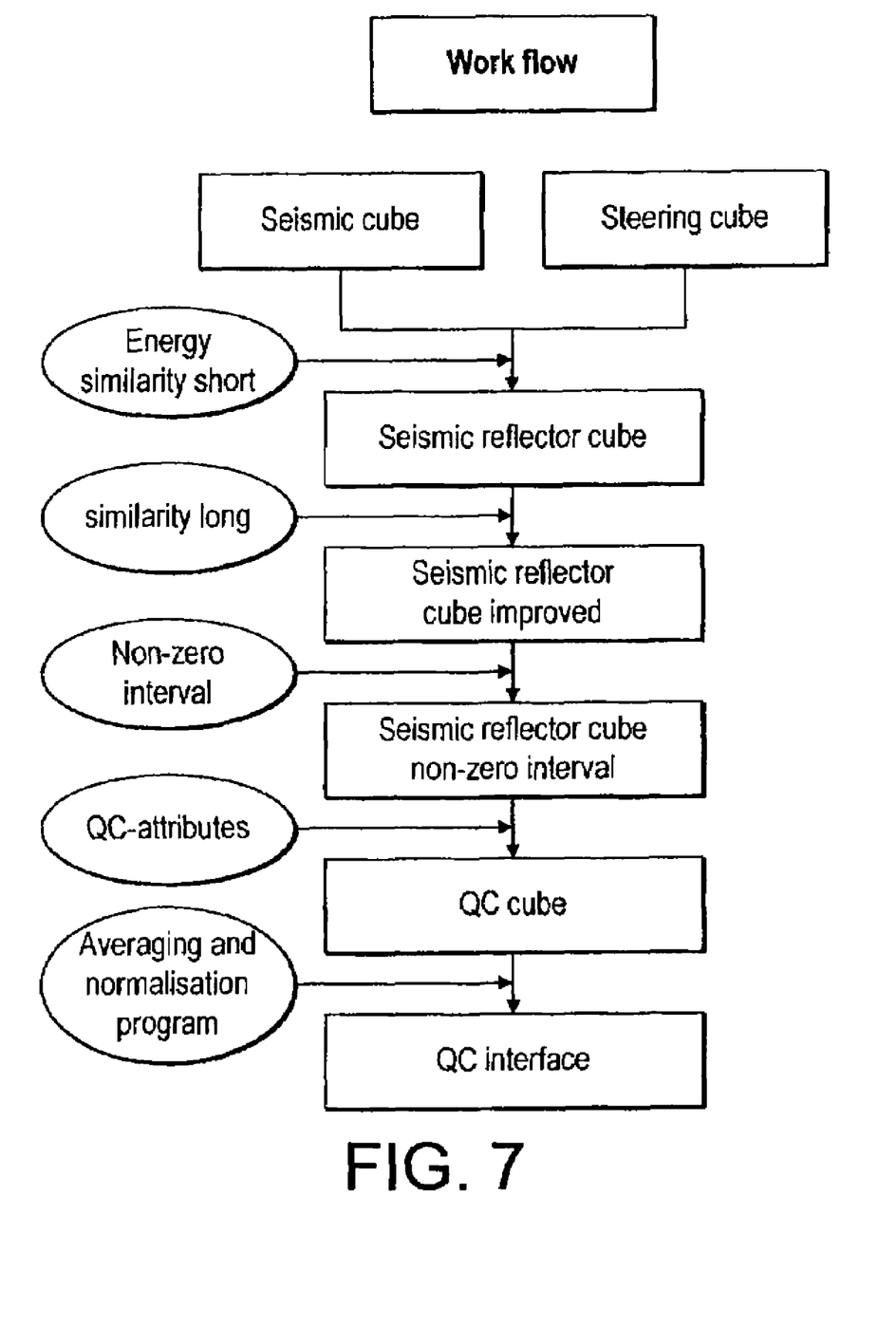
FIG. 7 is a flow diagram illustrating the processing of a seismic cube or seismic data volume to measure variations in seismic data qualities.

Referring to FIG. 6, a seismic cube is sectioned into sub-cubes showing the vertical stacking of the normalised quality measurements.

The invention claimed is:

1. A method of assessing acquisition errors in a seismic data volume, comprising the step of:
   measuring a quality of at least one seismic object with survey equipment;
   utilizing a computer to:
   classify the at least one seismic object as a reflector in the seismic data volume;
   vertically stack the measured quality;
   relate the stacked measurements on the basis of a vertical correlation; and
   identify a vertically correlated feature as a cobweb indicative of the acquisition errors.

2. The method of claim 1, wherein the measured quality is first normalized before the stacking step.

3. The method of claim 1, wherein the measurements which are stacked are taken from different locations in a seismic tube.

4. The method of claim 3, wherein the locations are inside reflectors, faults or other objects.

5. The method of claim 1, wherein the classifying, stacking and relating steps are performed at the same time that the seismic data volume is acquired.

6. The method of claim 1, wherein a neural network performs a classification of enhanced attributes.

7. The method of claim 6, wherein the neural network is a supervised neural network.

8. The method of claim 1, wherein seismic reflectors are used to detect or sample the cobweb.

9. The method of claim 1, further comprising the step of producing a survey report from the seismic data volume.

* * * * *